(12) United States Patent
Edery et al.

(10) Patent No.: US 11,403,403 B2
(45) Date of Patent: Aug. 2, 2022

(54) SECURE PROCESSING ENGINE FOR SECURING A COMPUTING SYSTEM

(71) Applicant: Kameleonsec Ltd., Caesaria (IL)

(72) Inventors: Yigal Edery, Pardesiya (IL); Jorge Myszne, Mountain View, CA (US); Efi Sasson, Kfar Tavor (IL); Ido Naishtein, Haifa (IL)

(73) Assignee: KAMELEONSEC LTD., Caesaria (IL)

( * ) Notice: Subject to any disclaimer, the term of this patent is extended or adjusted under 35 U.S.C. 154(b) by 45 days.

(21) Appl. No.: 16/847,565

(22) Filed: Apr. 13, 2020

(65) Prior Publication Data

US 2021/0319110 A1  Oct. 14, 2021

(51) Int. Cl.

| | |
|---|---|
| *G06F 21/64* | (2013.01) |
| *G06F 12/1081* | (2016.01) |
| *G06F 11/00* | (2006.01) |
| *G06F 12/14* | (2006.01) |
| *G06F 12/16* | (2006.01) |
| *G08B 23/00* | (2006.01) |
| *G06F 21/57* | (2013.01) |
| *G06F 21/78* | (2013.01) |
| *G06F 21/85* | (2013.01) |

(52) U.S. Cl.
CPC ........ *G06F 21/575* (2013.01); *G06F 12/1081* (2013.01); *G06F 21/64* (2013.01); *G06F 21/78* (2013.01); *G06F 21/85* (2013.01)

(58) Field of Classification Search
CPC .... G06F 21/575; G06F 21/1081; G06F 21/64; G06F 21/78; G06F 21/85
See application file for complete search history.

(56) References Cited

U.S. PATENT DOCUMENTS

| | | |
|---|---|---|
| 5,883,956 A | 3/1999 | Le et al. |
| 6,523,119 B2 | 2/2003 | Pavlin et al. |
| 7,484,247 B2 | 1/2009 | Rozman et al. |
| 7,930,360 B2 | 4/2011 | Sibert |
| 8,886,959 B2 | 11/2014 | Goto et al. |
| 9,536,111 B2 | 1/2017 | Sibert |
| 2006/0031940 A1* | 2/2006 | Rozman ................. G06F 21/53 726/27 |

(Continued)

FOREIGN PATENT DOCUMENTS

| | | |
|---|---|---|
| CA | 2685058 A1 | 11/2008 |
| WO | 2013168151 A2 | 11/2013 |

OTHER PUBLICATIONS

International Search Report and Written Opinion of International Searching Authority for PCT/US2020/028010, ISA/RU, Moscow, Russia, dated Nov. 13, 2020.

*Primary Examiner* — Darshan I Dhruv
(74) *Attorney, Agent, or Firm* — M&B IP Analysts, LLC

(57) ABSTRACT

A secure processing engine and method configured to protect a computing system are provided. The system includes a first processor configured to provide real-time protection to at least processes executed over the main processor of the protected computing system; and a direct memory access (DMA) configured to provide an access to a main memory of the main processor, wherein the first processor is coupled to the DMA and further configured to monitor the at least processes by accessing the main memory via the DMA; wherein the first processor operates in an execution environment in complete isolation from an execution environment of the main processor.

20 Claims, 7 Drawing Sheets

(56) References Cited

U.S. PATENT DOCUMENTS

| | | |
|---|---|---|
| 2008/0181227 A1 | 7/2008 | Todd |
| 2013/0139270 A1* | 5/2013 | Yoshida .................. G06F 21/51 726/26 |
| 2015/0113258 A1* | 4/2015 | Grieco .................. G06F 21/572 713/2 |
| 2015/0113602 A1 | 4/2015 | Korman et al. |
| 2016/0314299 A1* | 10/2016 | Aimer .................. G06F 21/6218 |
| 2018/0137285 A1* | 5/2018 | Yamada ................ G06F 12/023 |
| 2019/0180015 A1* | 6/2019 | Hughes ................ G06F 21/575 |
| 2020/0293636 A1* | 9/2020 | Martin .................. H04L 9/3073 |
| 2020/0349251 A1* | 11/2020 | Iyer ......................... G06F 21/85 |
| 2021/0216638 A1* | 7/2021 | Park ........................ G06F 21/74 |

* cited by examiner

SECURE PROCESSING ENGINE FOR SECURING A COMPUTING SYSTEM

TECHNICAL FIELD

The present disclosure relates generally to system security, and more particularly to a secure processing engine for use within a computing system.

BACKGROUND

As computer systems become increasingly complex and interconnected, the need for increased security is paramount. In response to modern computer networks growing increasingly sophisticated, potential attackers diligently search for security lapses to breach safety measures present in various systems. The established protocols of running anti-virus applications and inserting firewalls between an internal system and, for example, the internet, no longer offer sufficient protection on their own. One challenge presented in running security software is ensuring that a bad actor cannot gain access to the processes executing safety functions, e.g., running an anti-virus program, as this may allow malware to be inserted, may allow confidential information about the system to be exposed, and the like.

Computing systems are typically required to run multiple secure processes to ensure that they remain safe from bad actors and various vulnerabilities. Current security solutions, such as anti-malware software, sandboxing, runtime monitoring, rootkit detection, and the like, are often employed. In addition, modern operating systems also include a number of built in security functions, such as policies to ensure code integrity (e.g. Microsoft® Windows® AppLocker/Code Integrity), mechanisms to randomize memory of loaded processes (e.g., Address Space Layout Randomization), and virtualization to protect the operating system kernel itself (such as Windows® Virtual Secure Mode).

These security processes are typically executed by the main processor of a computing system (e.g., a server, a personal computer, a laptop, and so on). This presents a number of drawbacks. First, because the security applications run on the same hardware, there is limited security isolation. Any vulnerability introduced to the operating system or the main processor itself offers access to the security applications as well. Second, executing security applications on the same main processor as other computing tasks introduces a performance cost to the system, especially because a number of security functions are resource intensive, as well as introducing management overhead and increased complexity. The performance cost often causes people to compromise on security (as in, deploy less security functions) to gain better performance. Third, if the end-user is granted administrator rights on the system, security functions can be disabled by the user, either by mistake or because of a social-engineering hack. Previous generations of security tools have not solved these issues.

There have been many attempts to secure the main processor and the applications executed therein. One example of such attempts, involving the Windows Operating System, is shown in FIG. 1. A first generation of security applications, such as those executed in the Windows® 3.1 operating system 110, were configured to run any security application, such as an anti-virus program, within a user space 112 alongside other general applications, such as a word processor or email client. Thus, from a computing system perspective, there was no separation between the security software and other programs, leaving the security software vulnerable to any attacker or bad actor that had been granted rights to execute software within the user space. This results in a setup that is highly exposed to attacks.

The second generation of security applications, such as those run on the Windows® NT or 9× operating system 120, were configured to be run within the kernel 122 of the system itself. That is, the portion of the operating system code that is run in a protected memory region only accessible to "ring 0" applications and not run within the memory space of regular applications. Such an approach creates a distance between the security functions of the operating system and the regular user space. While this is an improvement over the first generation, the kernel itself is not wholly immune to attacks and remains vulnerable.

The third generation of security applications, such as those run on the Windows® 10 operating system 130, further distances the security applications by running them on a separate secure kernel 132, separated from the normal kernel 133 caused by general programs of the operating system. This configuration is possible due to the implementation of a hypervisor 134, which allows multiple kernels to run on a single hardware system. However, even this configuration is not immune to attacks because the configuration is still executed on the same, or a portion of the same, hardware. Thus, the hardware charged with security tasks is the same hardware that runs the system it is designed to protect. Further, hypervisor and firmware vulnerabilities could be exploited to bypass this configuration.

Such a configuration remains open to various attacks that are based on detecting internal processes and information about how the system itself functions. For example, two recent vulnerabilities exploited by attackers, the Meltdown and Spectre attacks, are side-channel attacks configured to decipher valuable information based on tangential data related to a system's memory usage and kernel files, respectively. These attacks rely on access to the system's main hardware in order to function properly, even without kernel access. A viable solution that prevents access to such information and ensures an elevated level of protection is needed.

The separation approaches discussed with reference to FIG. 1 are performed in software. There exist some attempts to provide separation in hardware, such as separation approach performed in hardware as provided by Intel® and AMD, and known as an Intel® Management Engine (ME) and AMD Platform Security Processor (PSP). Such solutions are autonomous subsystems that have been incorporated in the processor chipset. Therefore, for example, the Management Engine is not decoupled from the main processor. Further, such solutions are limited in the security features that they can execute. For example, such solutions are limited to validating boot processes, and initializing various security related mechanisms. Therefore, the solutions are limited to monitoring only the boot sequence or some limited set of signals. A major disadvantage of such solutions is the inability to proactively protect the entire system, and to fully monitor the memory the operating system at run time.

Further, such solutions do not provide an open platform architecture enabling security applications (not programmed, only by Intel® or AMD®, for example). Thus, this further limits the ability to support security applications.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a secure processing engine configured to protect a computing system. The system includes a first processor configured to provide real-time protection to at least processes executed over the main processor of the protected computing system; and a direct memory access (DMA) configured to provide an access to a main memory of the main processor, wherein the first processor is coupled to the DMA and further configured to monitor the at least processes by accessing the main memory via the DMA; wherein the first processor operates in an execution environment in complete isolation from an execution environment of the main processor.

Certain embodiments disclosed herein also include a method for securing a computing system. The method comprises providing, by a first processor of the security processing engine (SPE), real-time protection to at least processes executed over the main processor of the protected computing system; wherein the real-time protection is executed in an execution environment in complete isolation from an execution environment of the main processor.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
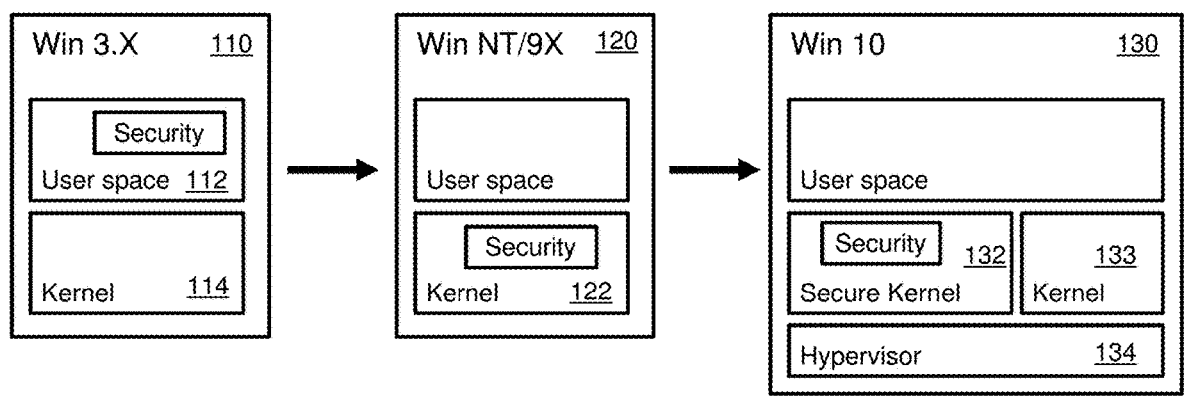
FIG. 1 is a block diagram illustrating the evolution of conventional security separation processes.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments provide a secure processing engine (SPE) which operates separately from the main processor of a computing system. The SPE is configured to secure the operation of the main processor and operating system(s) executed therein. The main processor and operating system(s) secured by the SPE will be referred to hereinafter after as the protected system. The SPE is configured to execute security applications separately from the protected entity, thereby preventing malicious code from being executed by the protected entity. In some embodiments, the security applications may be partially executed on the SPE and partially on the protected system, with the SPE ensuring the proper operations of applications being executed on the protected system.

Figure 2A:
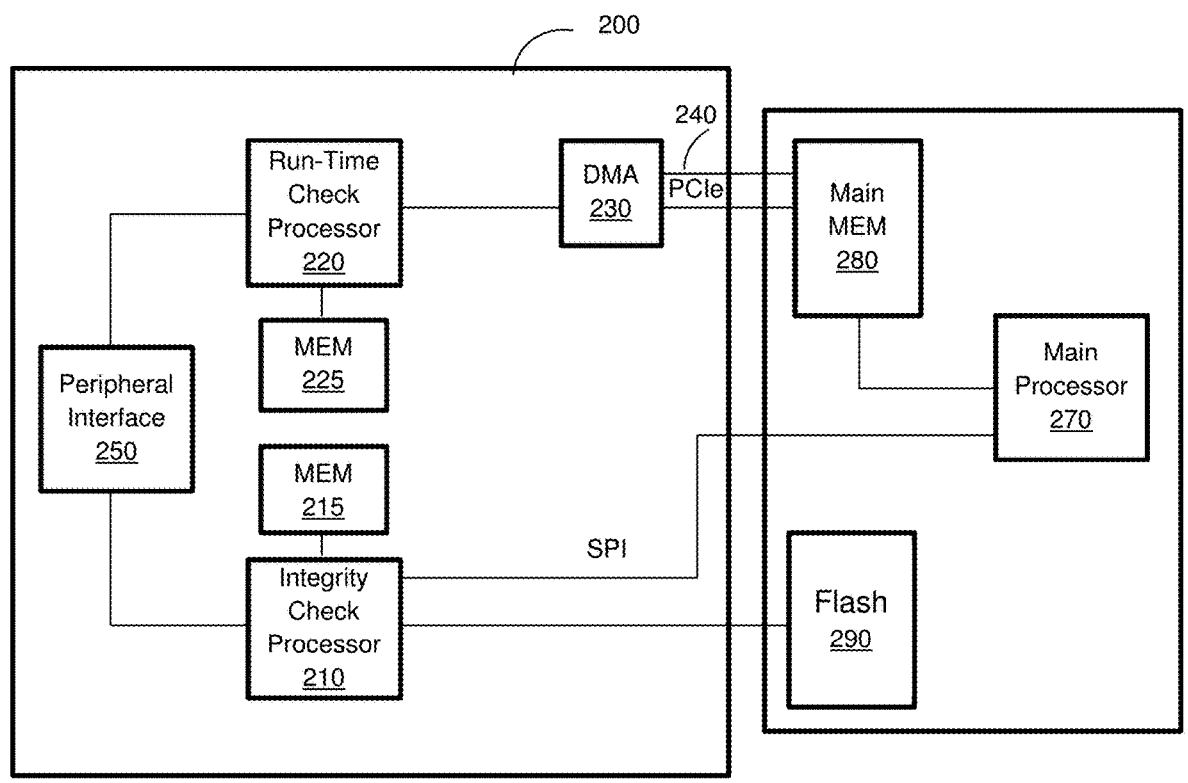
FIG. 2A is a block diagram of a secure processing engine (SPE) designed according to an embodiment.

FIG. 2A is an example block diagram of the SPE 200 designed according to an embodiment. The SPE 200 includes a first memory 215 coupled to an integrity check processor 210, and a second memory 225 coupled a run-time check processor 220. The run-time check processor 220 is also referred to as a "first processor" and the integrity check processor 210 is also referred to as a "second processor." The SPE 200 further includes a direct memory access (DMA) 230, over a high-speed interface (such as a PCIe bus) 240. In an optional embodiment, the SPE 200 includes a peripheral interface 250 to peripheral devices, such as a network interface card (NIC).

The PCIe bus 240 provides the connection to a main processor 270 via the PCIe bus 240. The DMA 230 provides direct access to a memory 280 of the main processor 270. The memory 280 may be, for example, a DRAM. The main processor 270 may be a single-core or multiple-core processor, such as is provided by Intel®, ARM®, and AMD®. The SPE 200 is further connected to a non-volatile memory (e.g., Flash memory) 290 via Serial Peripheral Interface. That is, the SPE 200 interposes the connection to Flash memory 290. The non-volatile memory 290 includes at least the BIOS of the protected system.

In certain configurations, the main processor 270 may include graphics processing units (GPUs), tensor processing units (TPUs), general-purpose microprocessors, microcontrollers, and digital signal processors (DSPs). The operating systems executed by the main processor 270 may include, but are not limited to, Windows®, Linux®, iOS®, and the like.

The integrity check processor 210 is configured to provide security functions of boot integrity control. To this end, the SPE 200 is configured to interpose the non-volatile memory 290. The SPE 200 is further configured to provide sequenced boot flow, to validate firmware images before the main processor 270 to executes the firmware, to validate BIOS images before allowing the main processor 270 to execute the images, and to validate attestation of all supported peripheral devices. The processor 210 can also provide boot integrity control on the run-time check processor 220. The processor 210 is interposed between the Flash memory and the main processor, and is physically part of the SPE 200.

The run-time check processor 220 provides run-time protection to the operating system or any other code running on the main processor 270. To further this aim, the run-time check processor 220 may access the main memory 280 via the DMA 230 to monitor and secure processes executed by the operation system. This is performed in complete synchronization with the operating system of the protected system. Such processes include execution of system drivers, instantiation of VMs, execution of VMs, execution of applications by the operating system, and more.

Figure 2B:
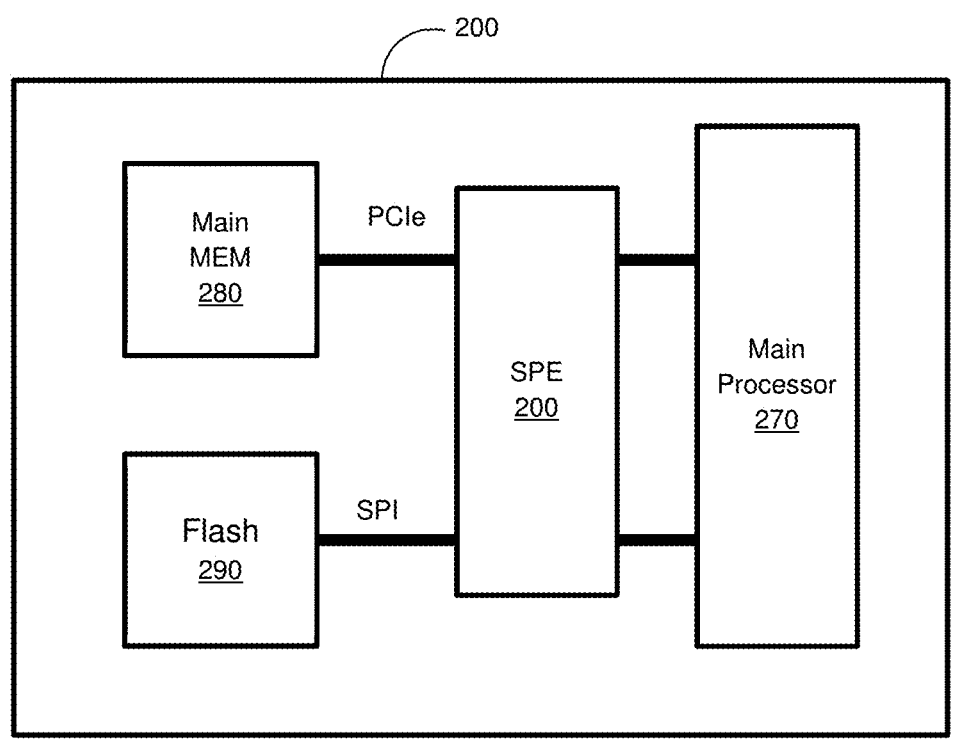
FIG. 2B is a block diagram of a secure processing engine (SPE) serving as a proxy according to another embodiment.

In other embodiments, access to the main memory 280 is granted only through the SPE 200. The SPE 200, in such configurations, serves as a proxy between the main processor 270 and the memory 280. This would allow for protecting systems with encrypted memory as well. It should be noted that in such embodiments, access to the memory is not through the DMA 230, and the DMA 230 is not included in the SPE 200. An example diagram showing the SPE 200 operable as a proxy is provided in FIG. 2B.

In an embodiment, the run-time check processor 220 is configured to perform a plurality of security functions, such as anti-virus, malware detection, intrusion detection, integrity checks, code polymorphism, control flow integrity enforcement, alerting into security information and event management (SIEM) systems, and the like. In an embodiment, one of the security functions includes polymorphism of the code being executed. An example method for performing code polymorphism is described in U.S. patent application Ser. No. 16/601,938, filed Oct. 15, 2019 assigned to the common assignee, and it is hereby incorporated by reference for all which is contained.

It should be appreciated that all security functions executed by the integrity check processor 210 and run-time check processor 220 are executed in complete isolation from the main processor 270, and in isolation from each other. This allows the SPE 200 to provide a guarantee against malicious tampering with any process executed by the protected system (i.e., the main processor 270 and its operating system).

In an embodiment, the computing power of the integrity check processor 210 can be different than that of the run-time check processor 220. The integrity check processor 210 may be, for example, a single-core processor, while the second processor 220 may be a multi-core processor. It should be noted that any of the integrity check processor 210 and the run-time check processor 220 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), central processing units (CPUs), general-purpose microprocessors, microcontrollers, and the like, or any other hardware logic components that can perform calculations or other manipulations of information. The processor 220 can also be realized in polymorphic hardware, as discussed in U.S. patent application Ser. No. 16/670,110, filed Oct. 31, 2019 assigned to the common assignee, and it is hereby incorporated by reference for all which is contained.

The first and second memory 215 and 225 may be program memory containing instructions to be executed by the first and second processors. The first and second memory 215 and 225 may include volatile (e.g., RAM, etc.), non-volatile (e.g., ROM, flash memory, etc.), or a combination thereof. In one configuration, computer readable instructions to implement one or more embodiments disclosed herein may be stored in the first and second memory 215 and 225.

In another embodiment, the first and second memory 215 and 225 are configured to store software and configuration data. Software shall be construed broadly to mean any type of instructions, whether referred to as software, firmware, middleware, microcode, hardware description language, or the like. Instructions may include code (e.g., in source code format, binary code format, executable code format, or any other suitable format of code). The instructions, when executed by the first and second processors, cause the respective processor (210 or 220) to perform the various processes described herein.

As all of the security functionality of the SPE is performed by dedicated processors or hardware (e.g., processors 210 and 220), the main processor is configured to execute the standard applications without the main operating system sacrificing resources, thus increasing efficiency and reducing cost.

In an example configuration, the SPE 200 may be further configured with a unique identity and unclonable per chip. Thereby, the SPE 200 can be used as a trustworthy and unclonable identity to establish evidence of ownership of a system. In an embodiment, each SPE 200 has a unique identify embedded therein, for example, which can be generated in the factory or provisioned after the fact. This unique ID can be used to authenticate the protected system or grant a user or application access.

Figure 3:
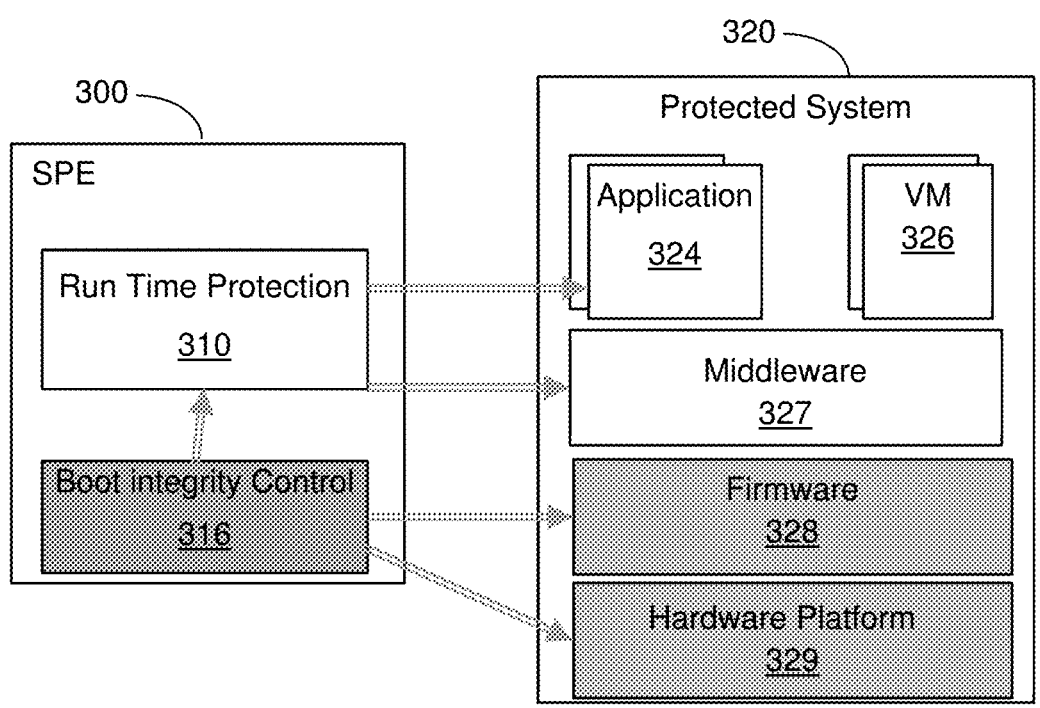
FIG. 3 is a functional diagram illustrating the operation of the SPE in tandem with a protected system according to an embodiment.

FIG. 3 is an example functional diagram illustrating the operation of the SPE 200 in tandem with a protected system 320 according to an embodiment. The SPE 200 is directed to two security features, a boot integrity control 316 and a run time protection 310.

The boot integrity control 316 is primarily directed at securing the protected system 320 during boot of the system and the boot of the run time protection 320. To this end, the security functions provided under the control 316 includes at least firmware integrity of the firmware 328 and attestation of the peripherals in the hardware platform 329, as well as firmware that is part of run time protection 320. The boot integrity control 316 can optionally be further configured to operate as a trusted platform module (TPM), thereby enabling the securing of hardware through integrated cryptographic keys. The boot integrity control 316 is performed by the integrity check processor 210 (see FIG. 2A) of the SPE.

The run time protection 310 provides execution of security functions over processes and flows executed in the protected system 320. The run time protection 310 is performed by the second processor 220 (see FIG. 2A) of the SPE. As illustrated in FIG. 3, the run time protection 310 secures any processes by middleware 327 executed over the protected system 320. The middleware 327 collectively refers to the operating system, kernel, hypervisor, and drivers executed over the hardware platform 329. The run time protection 310 further protects applications 324 (e.g., a word processor, an email application, etc.), and one or more virtual machines (VMs) 326.

The security functions provided by the run time protection 310 include, for example, functions such as anti-virus, malware detection, intrusion detection, code polymorphism, integrity checks, alerting, and the like. The run time protection 310 can be further configured to offload certain key operating system components, such as sensitive kernel code, into the secure environment. As noted above, the run time protection 310 monitors the memory of the protected system 320 and executes security functions as needed. In an embodiment, the run time protection 310 may be pre-configured such that each process executed in the middleware 327 may be secured. This configuration may be a default for all processes or only sensitive processes. The same is true of applications 324 and VMs 326. For example, a run time protection 310 may be configured to secure a VM 326 accessing sensitive resources.

It should be appreciated that the SPE 300 provides a complete isolated trusted execution environment. The isolated nature of the SPE 300 enables trusted execution of the security application, which secures the processes, applications 324, and VMs 326 on the protected system 320. Further, the isolated execution environment guarantees the integrity of the code the environment runs, as the SPE 300 can be configured to only accept properly signed code for execution.

Because the SPE 300 is separate from the main processor in the hardware platform 329 of the protected system 320, it is not subject to side channel attacks that rely on information provided by malicious code in separate processes 324 running on the main processor in the hardware platform 329. Further, the SPE 300 can be configured to control the security applications performed by the run time protection 310 without allowing input or modifications from a user, thus ensuring that a user cannot disable the security applications, either intentionally or otherwise.

Additionally, a single SPE 300 is configured to allow for easier and more practical enforcement of a chain of trust from the initial boot to the applicative security. That is, the boot integrity control 316 ensures the SPE 300 is only configured to load verified security code without any unsigned/unverified code that could break the chain of trust.

In an embodiment, the SPE 300 is configured to monitor the protected system 320 without need for instructions from the general processor included in the hardware platform 329. In another embodiment, a communication channel may be established between the SPE 300 and the protected system 320 to enable receiving instructions over such a channel. The communication channel is firewalled and authenticated to prevent undesirable communication from passing through.

Figure 4A:
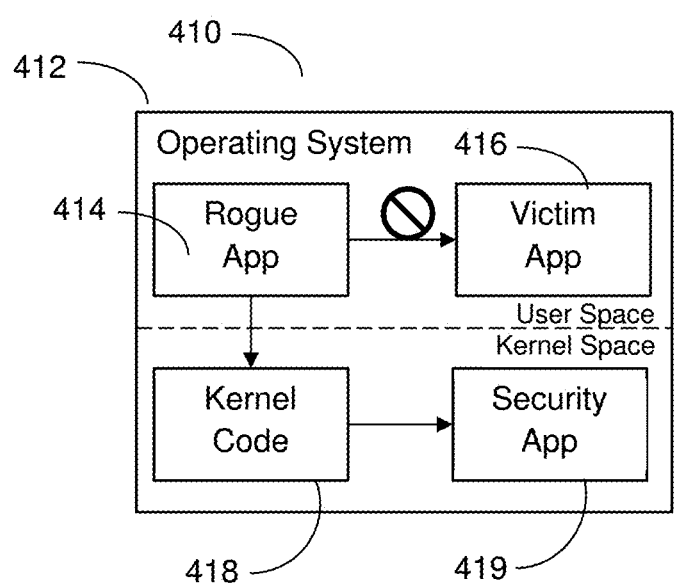
FIGS. 4A and 4B are diagrams illustrating the operation of the SPE in preventing a cyber-attack on a protected system.
Figure 4B:
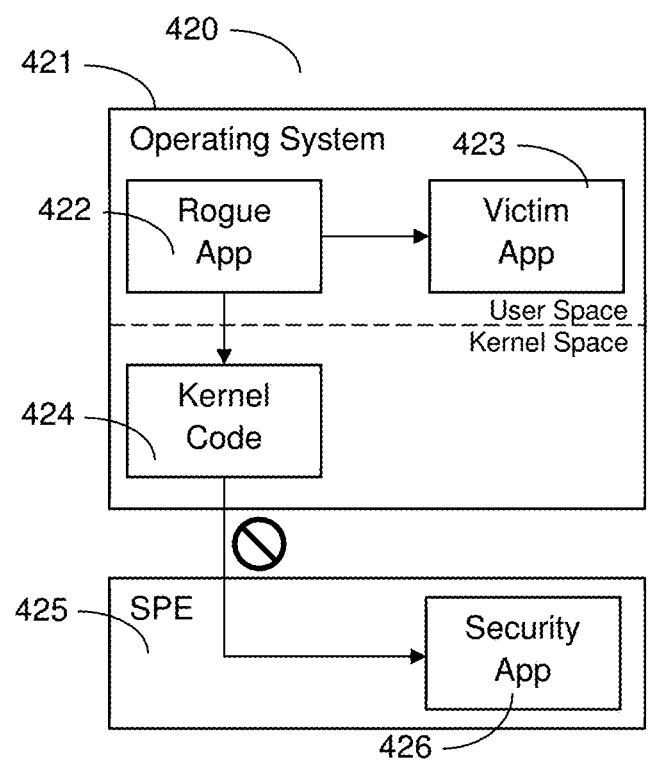

FIGS. 4A and 4B are example diagrams illustrating the operation of the SPE in preventing a cyber-attack on a protected system. FIG. 4A shows a protected system 410 with no SPE. FIG. 4B shows a protected system 420 with an SPE 425.

In FIG. 4A, for the protected system 410, with no separate SPE 425, security applications 419 run within the same kernel space as kernel code 418 of the operating system 412, and if a rogue application (e.g., malware) 414 is successfully implemented, the rogue application 414 will be executed in the user space. While this setup may be sufficient to protect from direct attacks against a victim application 416, the security application 419 itself is susceptible to any vulnerabilities that may exist in shared kernel code 418. This can provide the rogue application 414 access to the kernel code 418 to disable or modify the security application 419.

In FIG. 4B, for the protected system 420 with the separate SPE 425, the security application 426 is fully isolated from the operating system 421. Thus, even if a rogue application 422 successfully takes control of the kernel code 424, the security application 426 remains protected.

Figure 5:
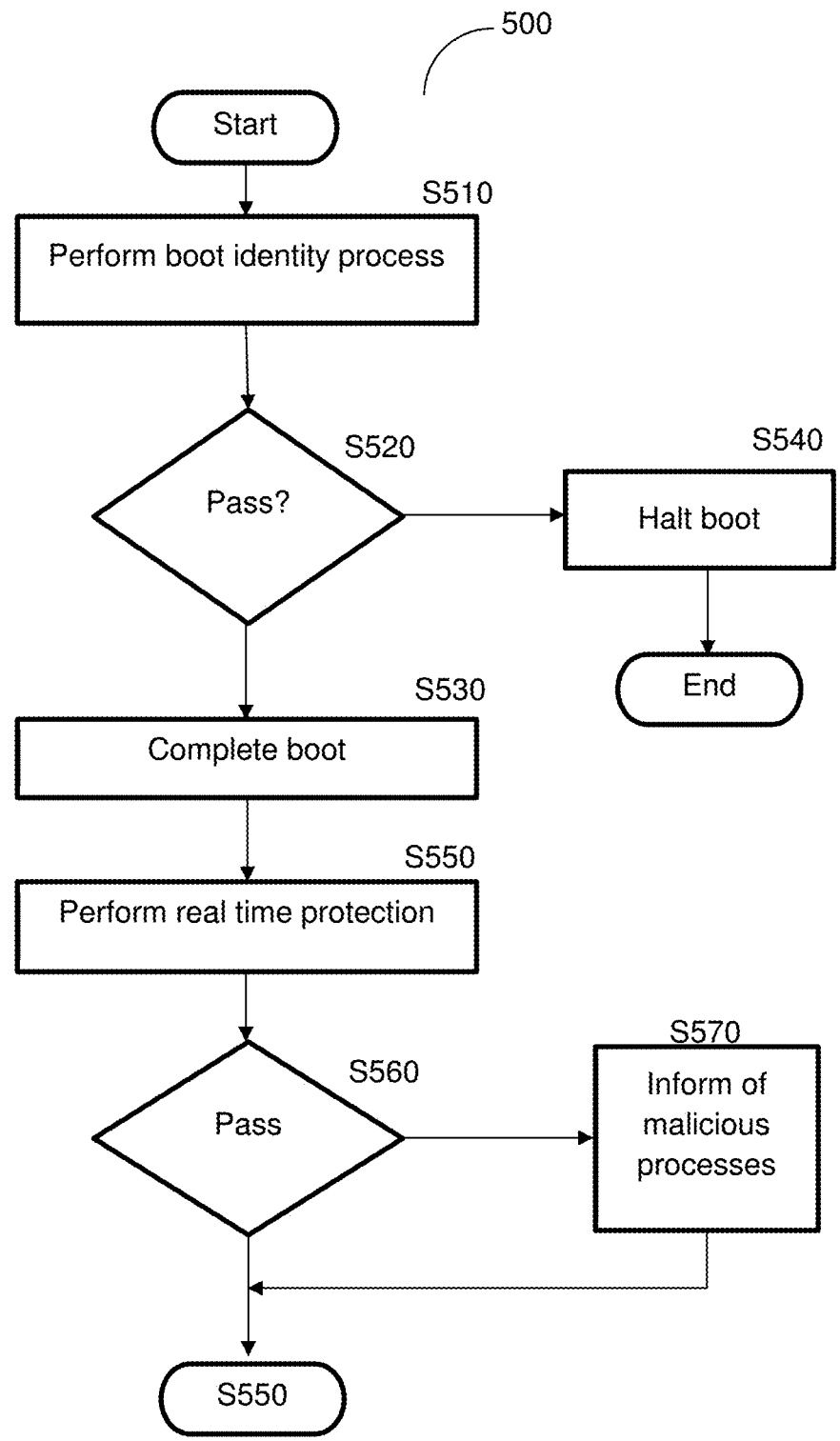
FIG. 5 shows an example flowchart illustrating a method for providing an isolated execution environment according to an embodiment.

FIG. 5 shows an example flowchart illustrating a method 500 for providing an isolated execution environment according to an embodiment. The method is performed by the SPE discussed herein.

At S510, a boot integrity control process is performed by the integrity-check processor of the SPE. In an embodiment, S510 the loading of the BIOS of the protected system from the system's Flash and the BIOS is checked and validated. The BIOS is checked for proper signatures, by a verified signer, which the integrity-check processor is configured to accept. In embodiment, S510 further includes validating the firmware of the protected system, for example, by checking that the firmware is signed by a verified signer. In yet another embodiment, S510 further includes validating attestation of all supported peripheral devices connected to the protected system.

At S520, it is checked if the boot integrity control process successfully passed and, if so, at S530, an instruction is provided to the main processor to complete the boot of the protected system. Otherwise, at S540, an instruction is provided to the main processor to halt the boot process.

At S550, real-time protection of the protected system is performed. In an embodiment, S550 includes accessing the memory of the protected system to monitor any process, application, and/or VM executed in the protected system, each of which can be checked in isolation by one or more security functions of the SPE. The real-time protection is performed by a run-time check processor 220 of the SPE 200. Examples for security functions utilized at S550 are provided above.

At S560, it is checked if any process, application, and/or VM breaches a security function utilized at S550. If so, at S570, an indication is provided to the main processor informing the main processor of the potentially malicious process, application, and/or VM. Otherwise, execution returns to S550. In some configuration, the indication may be provided to a secondary processor in the protected system, an external system, and the like. The external system may include, for example, security information and event management (SIEM). In certain embodiments, the SPE can perform a mitigation action, if attacks are detected. For example, the SPE can halt the protected system to prevent further compromise. This ensures that even if the main processor is compromised and does not receive instructions from the SPE, the SPE can still stop detected attacks.

It should be emphasized that the methods discussed with reference to FIG. 5 are executed in complete isolation from the main processor of the protected system.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A secure processing engine configured to protect a computing system, comprising:
    a first processor configured to provide real-time protection to at least processes executed on a main processor of the protected computing system; and
    a direct memory access (DMA) configured to provide an access to a main memory of the main processor, wherein the first processor is coupled to the DMA and further configured to monitor the at least processes by accessing the main memory via the DMA; and
    a second processor configured to interface with a non-volatile memory of the main processor and to perform boot integrity control of at least a BIOS of the main processor of the protected computing system, wherein the second processor is configured to perform the boot integrity control of the first processor by loading the BIOS of the protected system from the non-volatile memory, and checking that the BIOS is properly signed by a verified signer, wherein the verified signer is configured in the second processor;
    wherein each of the first processor and the second processor operates in an execution environment in complete isolation from an execution environment of the main processor.

2. The secure processing engine of claim 1, further comprising:
    a high-speed bus to provide a connection to the main processor; and
    at least one peripheral interface to at least one peripheral device.

3. The secure processing engine of claim 2, wherein the first processor, the second processor, the DMA, the high-speed bus interface, and the at least one peripheral interface are integrated in a single system on chip.

4. The secure of processing engine of claim 1, wherein the second processor is further configured to:
    load a firmware of the first processor from the non-volatile memory; and
    check that the firmware of the first processor is properly signed.

5. The secure processing engine of claim 4, wherein the second processor is further configured to:
    validate that a firmware of the main processor is signed by a verified signer, wherein the verified signer is configured in the second processor; and
    validate attestation of all supported peripheral devices connected to the protected computing system.

6. The secure processing engine of claim 1, wherein the first processor is further configured to:
    monitor the memory of the main processor to check that at least one process requires protection; and
    apply at least one security application to the process which requires protection.

7. The security processing engine of claim 6, wherein the first processor is further configured to: halt execution of the process requiring protection when execution of a security function fails.

8. The secure processing engine of claim 6, wherein the least one security application is any one of:
    anti-virus, malware detection, intrusion detection, integrity checks, code flow integrity enforcement, and code polymorphism.

9. The secure processing engine of claim 6, wherein the at least one process includes any one of: a process executed by a middleware, a software application, or a virtual machine.

10. The secure processing engine of claim 9, wherein the middleware includes any one of: an operating system, a kernel, or a hypervisor.

11. The security processing engine of claim 1, wherein the second processor is further configured to perform at least one of: halt operation of the protected computing system when the boot integrity control fails or report when the boot integrity control fails.

12. The security processing engine of claim 1, wherein the security processing engine serves as a proxy between the main processor and the main memory.

13. A method for securing a computing system, comprising:
    providing, by a first processor of the security processing engine (SPE), real-time protection to at least processes executed on a main processor of the protected computing system; and
    performing, by a second processor of the SPE, boot integrity control of at least a BIOS of the main processor of the protected computing system; and
    performing the boot integrity control of the first processor by loading the BIOS of the protected system from a non-volatile memory, and checking that the BIOS is properly signed by a verified signer, wherein the verified signer is configured in the second processor, wherein the second processor is configured to interface with the non-volatile memory of the main processor;
    wherein each of the real-time protection and boot integrity control is executed in an execution environment in complete isolation from an execution environment of the main processor.

14. The method of claim 13, further comprising:
    loading a firmware of the first processor from the non-volatile memory; and
    checking that the firmware of the first processor is properly signed.

15. The method of claim 14, further comprising:
    validating that a firmware of the main processor is signed by a verified signer, wherein the verified signer is configured in the second processor; and
    validating attestation of all supported peripheral devices connected to the protected computing system.

16. The method of claim 13, wherein the real-time protection further comprises:
    monitoring the memory of the main processor to check that one process of the at least processes requires protection; and
    applying at least one security application to the process that requires protection.

17. The method of claim 16, further comprising:
    halting execution of the process requiring protection when execution of a security function fails.

18. The method of claim 16, wherein the least one security application is any one of:

anti-virus, malware detection, intrusion detection, integrity checks, code flow integrity enforcement, and code polymorphism.

19. The method of claim 16, wherein the at least one process includes any one of: a process executed by a middleware, a software application, or a virtual machine.

20. A non-transitory computer readable medium having stored thereon instructions for causing a processing circuitry to execute a process for securing a computing system, the process comprising:

providing, by a first processor of the security processing engine (SPE), real-time protection to at least processes executed over a main processor of the protected computing system;

performing, by a second processor of the SPE, boot integrity control of at least a BIOS of the main processor of the protected computing system; and perform the boot integrity control of the first processor by loading the BIOS of the protected system from a non-volatile memory, and checking that the BIOS is properly signed by a verified signer, wherein the verified signer is configured in the second processor, wherein the second processor is configured to interface with the non-volatile memory of the main processor;

wherein each of the real-time protection and boot integrity control is executed in an execution environment in complete isolation from an execution environment of the main processor.

* * * * *